(12) United States Patent
Hehl

(10) Patent No.: US 8,292,610 B2
(45) Date of Patent: Oct. 23, 2012

(54) DEVICE FOR MANUFACTURING A THREE-DIMENSIONAL OBJECT

(75) Inventor: Karl Hehl, Lossburg (DE); Julie Hehl, legal representative, Lossburg (DE); Renate Keinath, legal representative, Balingen (DE)

(73) Assignee: Arburg GmbH + Co. KG (DE)

( * ) Notice: Subject to any disclaimer, the term of this patent is extended or adjusted under 35 U.S.C. 154(b) by 65 days.

(21) Appl. No.: 12/974,118

(22) Filed: Dec. 21, 2010

(65) Prior Publication Data

US 2012/0156319 A1  Jun. 21, 2012

(51) Int. Cl.
  *B29C 45/16* (2006.01)
(52) U.S. Cl. .............. 425/375; 264/6; 264/13; 264/308; 425/564; 700/117; 700/118; 700/119
(58) Field of Classification Search .................. 425/375, 425/562, 563, 564; 264/6, 13, 308; 700/117, 700/118, 119
See application file for complete search history.

(56) References Cited

U.S. PATENT DOCUMENTS

| | | | | |
|---|---|---|---|---|
| 3,191,233 | A * | 6/1965 | Linderoth, Jr. | 425/562 |
| 4,643,854 | A * | 2/1987 | Kendall et al. | 264/12 |
| 5,225,217 | A * | 7/1993 | Wisen et al. | 425/564 |
| 6,259,962 | B1 | 7/2001 | Gothait | |
| 6,280,784 | B1 * | 8/2001 | Yang et al. | 425/375 |
| 6,658,314 | B1 | 12/2003 | Gothait | |
| 6,850,334 | B1 * | 2/2005 | Gothait | 700/118 |
| 7,104,773 | B2 * | 9/2006 | Maekawa et al. | 425/174.4 |
| 8,070,474 | B2 * | 12/2011 | Abe et al. | 425/375 |
| 2006/0157892 | A1 * | 7/2006 | Larsson | 264/308 |
| 2011/0074065 | A1 * | 3/2011 | Batchelder et al. | 264/308 |
| 2012/0068378 | A1 * | 3/2012 | Swanson et al. | 264/308 |

FOREIGN PATENT DOCUMENTS

| | | |
|---|---|---|
| DE | 19626428 A1 | 1/1998 |
| DE | 20005997 A1 | 10/2000 |
| DE | 19931112 A1 | 1/2001 |
| DE | 10013450 B4 | 9/2001 |
| DE | 10013451 A1 | 10/2001 |
| EP | 1637307 A2 | 3/2006 |
| EP | 1886793 A1 | 2/2008 |
| WO | 9505943 A1 | 3/1995 |
| WO | 0052624 A1 | 9/2000 |
| WO | 0076772 A1 | 12/2000 |
| WO | 0126023 A1 | 4/2001 |
| WO | 0153105 A2 | 7/2001 |
| WO | 2004044816 A1 | 5/2004 |
| WO | 2004050323 A1 | 6/2004 |
| WO | 2004096514 A2 | 11/2004 |
| WO | 2004096527 A2 | 11/2004 |
| WO | 2005053928 A2 | 6/2005 |

\* cited by examiner

*Primary Examiner* — Tim Heitbrink
(74) *Attorney, Agent, or Firm* — Cantor Colburn LLP

(57) ABSTRACT

A device for the production of a three-dimensional object made of solidifiable material having at least one processing unit (11) for the processing of the solidifiable material into a liquid phase to discharge the material from a material reservoir (12) via a discharge unit (13) in the direction of a construction space (17) in the form of intermittent drops (15). The conditions required for this can be satisfied (FIG. 2) via the closing mechanism featuring a plastic malleable solid body joint (24).

13 Claims, 4 Drawing Sheets

DEVICE FOR MANUFACTURING A THREE-DIMENSIONAL OBJECT

TECHNICAL FIELD

The invention concerns a device for the production of a three-dimensional object made of solidifiable material in accordance with the generic term of claim 1.

BRIEF DISCUSSION OF RELATED ART

It is common in plastic parts manufacturing to produce large batch sizes and serial parts by injection molding or extrusion. The advantage of plastic injection molding is, in particular, owing to the highly accurate production of complex part geometries, whereby the functionality of the injection molding process optimally satisfies the requirements for the cost-effective and economical production of plastic parts.

At the same time, the need for individual units and small batch sizes of plastic parts, as for example sample parts with the requirement of being supplied within a short time frame, as well as properties similar to those of injection molding parts, is continuing to grow. Manufacturing processes exist for the production of such parts which are widely known under the term "prototyping." The production of such parts is generally based on the generation of the geometry from 3D data. These geometries are produced in a variety of forms by using the corresponding material, such as meltable layers of powder by heat input, e.g. with lasers, by generative systems such as printing processes, in various combinations of powder parts and using the "melt strand" process.

A device is known from EP 1 886 793 A1, on which the generic term of claim 1 is based, for which one of the plasticizing units common to the injection molding technique is coupled to a material reservoir that can be placed under pressure for the liquid phase of a material. For the production of an object on a slide in a construction space, this material is being discharged via a discharge orifice in the shape of drops whereby, owing to the adhesive forces of the material, high pressure and generally high temperatures must also be applied. In the process, the drops should be 0.01 to 0.5 mm$^3$ in size. The shutter speed of the discharge aperture should preferably be in the range of several milliseconds, and the diameter of the discharge orifice in the range of several tenths of a millimeter.

From WO 95/05943, a principle similar to ink jet printing is known whereby individual drops made of one material are deposited. The depositing of the drops occurs using common piezo converters, whereby material is supplied siphon-like from a storage tank. The material in contact with the print head is therefore not under pressure.

The processes according to U.S. Pat. Nos. 6,850,334 B1 and 6,658,314 B1, in which photopolymer materials are printed based on the principles of ink jet printing and are subsequently exposed, function using a similar principle. This field includes many applications relative to the design of the associated print heads and the elimination of problems arising in the process (e.g. U.S. Pat. No. 6,259,962 B1, WO 00/52624 A1, WO 00/76772 A1, WO 01/26023 A1, WO 01/53105 A2, WO 2004/044816 A1, WO 2004/050323 A1, WO 2004/096514 A2, WO 2004/096527 A2, WO 2005/053928 A2, EP 1 637 307 A2 or DE 199 31 112 A1).

DE 100 13 451 A1 and DE 100 13 450 B4, or even DE 196 26 428 A1 and DE 200 05 997 U1, are in particular concerned with the principle of how to best generate monodisperse drops with the best uniform particle size possible using piezoelectric vibration generators. However, this has nothing in common with the generation of drops in plastics engineering.

For a solution in which the highly viscous liquid materials, such as melted plastics, in which small quantities are to be processed from a material reservoir in small discrete individual portions down to several micrograms, which is under high pressure and possibly at high temperatures, sealing problems soon occur, in particular should the discharged portions possess such a high kinetic energy that they can overcome adhesion forces and become detached from the device and fly away in droplet form.

BRIEF SUMMARY

Starting with this state of the art, this invention concerns the task of creating a device for the production of a three-dimensional object that also works reliably under the conditions stated.

This task is accomplished by a device with the characteristics of claim 1.

Under the conditions stated, the discharge device, as a dosing unit, exhibits the lowest possible number of seals on the exterior. For this reason, the sealing material features an elastic malleable solid body joint. As a result, the sealing material, preferably shaped as a jet needle, can, on the one hand, be manipulated and, on the other, the actuator is not exposed to the more testing conditions of the material reservoir. Therefore, apart from the filling opening of the material reservoir and the discharge aperture, no further seals are necessary. As the solid body joint also exhibits quasi integrated restoring forces with respect to the actuators having an influence from the exterior, the connection of the actuator to the material reservoir can occur with minimal contact surface and unilaterally relative to the effect of the force.

Additional advantages arise from the subsidiary claims and the following description.

BRIEF DESCRIPTION OF THE FIGURES

In the following, the invention is described in more detail in accordance with the embodiment of the invention represented in the figures. The following is shown.

DETAILED DESCRIPTION

Figure 1:
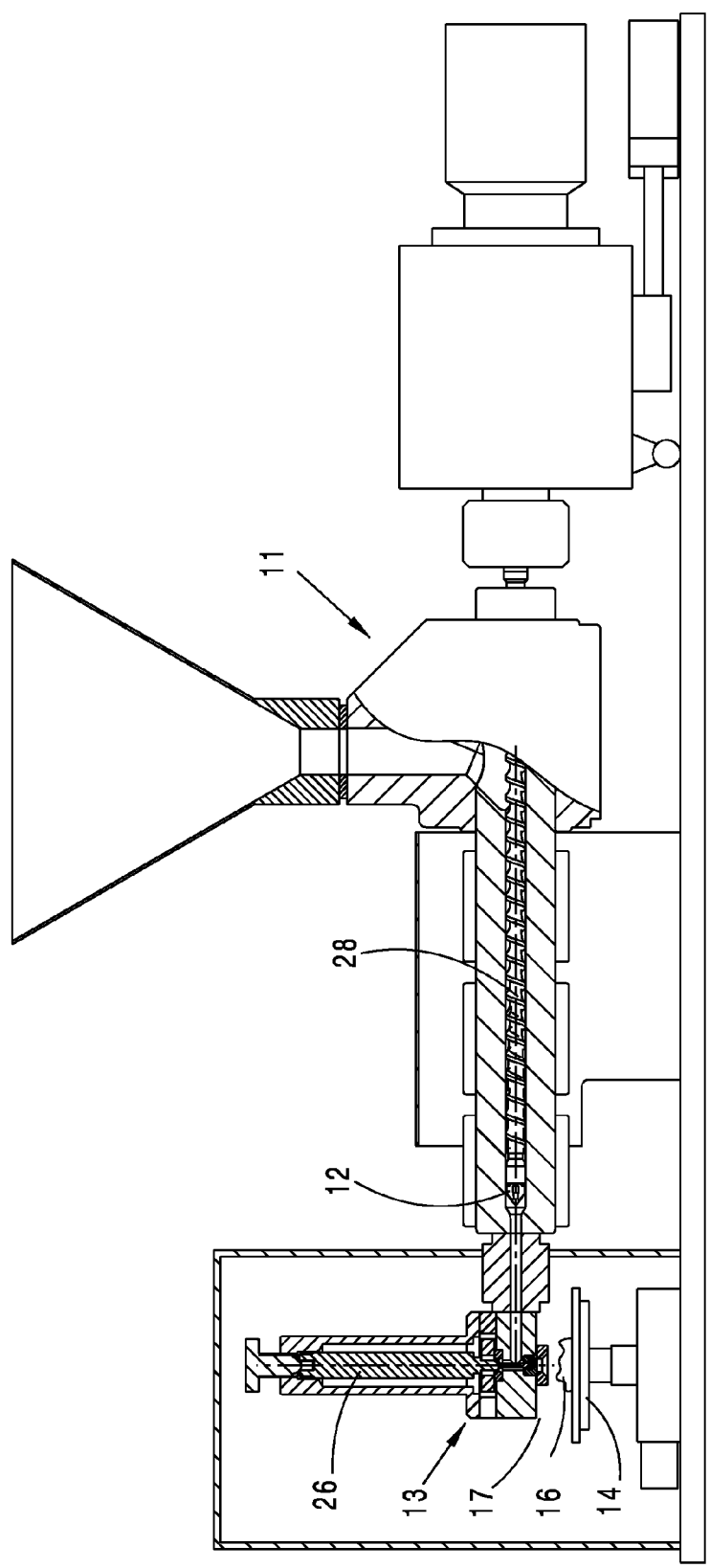
FIG. 1 A partially sectioned side view of the device

The invention will now be explained in more detail using examples with reference to the attached drawings. However, the embodiments are only examples which should not restrict the inventive concept to a certain configuration. Before the invention is described in detail, it must be pointed out that it is not restricted to the respective components of the device or the respective process steps, as these components and processes can vary. The terms used here are merely intended to describe particular embodiments, and are not used in a restrictive manner. If, in addition to the description or the claims, an individual or undefined item is used, then this also refers to the plural of these elements, provided the overall context does not make something else unambiguously clear.

The figures show a device for the production of a three-dimensional object 16 of solidifiable material, which is present either in its initial state or a liquid phase or which can be liquefied by the sequential discharge of drops. For example, this can occur as a result of intermittent individual drops 15 being discharged sequentially from a discharge unit 13, until layer by layer object 16 results on the slide 14 in construction space 17. The solidifiable material is a plasticized material, i.e. silicone, or a plasticizable material such as plastic or even materials in powder form, whereby this essentially depends on the solidifiable material either being present in its initial state in a liquid phase or that it can be liquefied. The material can also be a material that can be reversibly melted and thus recycled. Any number of other materials can be used, provided they are plasticizable by the device and, primarily, which at minimum are dischargeable by discharge unit 13.

The solidifiable material in the liquid phase features a "laminar source flow". The addition of the melt, amongst other things, enters into the laminar flow. This becomes most clear when looking at the state of knowledge of injection molding technology. During the mold filling of a simple rectangular channel, the melt is injected via an injection point and spreads from this point with closed flow fronts in a circular fashion, until it fills the entire width of the cavity. Some time later, the area between the inflow and the flow front can be regarded as nearly fully formed. At the flow front itself, a particular flow situation prevails, the source flow, as the stream lines in this area appear as a source when viewed relative to a co-moving coordinate system. The melt flows between two of the nearby rapidly solidified bulk layers close to the cavity surfaces and then proceeds toward the flow front at a higher velocity in the middle of the cavity. Shortly before the melt reaches the flow front, its velocity component is reduced in the direction of the flow and it flows diagonally to the wall until it touches the wall.

The laminar source flow is, on the one hand, owing to its laminar formation, an advantage for the generation of the drop 15 "targeted" at construction space 17, on the other, in particular for the formation of small drops, this precisely also presents problems, making the implementation with devices and materials known from the injection molding technique more difficult. Adhesion to the wall leads to the substances only being able to form drops of the required low volumes in the range equivalent to 1 mm$^3$ and desired flight velocity with difficulty, on the other hand precisely the correspondingly high viscosity of the material is important for the formation of the suitable drop shape of an intermittent drop.

This also differentiates the materials used from the previously known waxes. Owing to their viscosity, waxes can be discharged by normal thermal printing or ink jet processes, and therefore by purely kinematic, unpressurized accelerations without a difference in pressure of the melted drop. The materials used here already set themselves apart by having a viscosity number that is greater by one or more orders of magnitude. Thus the dynamic viscosity number of the solidifiable material is between 100 and 10,000 [Pa s], whereby the solidifiable material is ideally a plastic routinely used in injection molding, or a resin. This requires processing from a material reservoir that can be pressurized, as pressures of more than 10 to 100 MPa (100 to 1000 bar) are easily required, in particular when small discharge orifices are used to achieve small drop volumes.

The ideal drop 15 volume ranges from 0.01 to 0.5 mm$^3$, preferably 0.05 to 0.3 mm$^3$ and ideally around 0.1 mm$^3$. The diameter of the discharge opening 20, in particular is smaller or equal to 1 mm, preferably about 0.1 mm. In the case of a completely standard injection velocity of 100 [cm/s], which delivers the substance through a pinpoint gate with a diameter of 0.1 [mm], a value of 10,000 [m/s] results for the volume flow through the area. This results in a laminar source flow with flow velocities of up to 10,000 m/s for the liquid phase.

The device, with its discharge unit, has the task of discharging highly viscous liquid materials such as molten plastics in small quantities down to several micrograms, from a material reservoir 12, which is under high pressure and possibly at a high temperature. The smallest quantities/drops 15 of the material will be released in discrete individual portions, whereby their size can be influenced by the device. The discharged portions have such a high kinetic energy that they can overcome adhesive forces and become detached from the device and fly away in droplet 15 form, to create object 16 on the slide 14 in construction space 17.

As this concerns liquid but highly viscous materials with a high adhesive force and low weight, the kinetic energy is transferred via a pressure difference between material reservoir 12 and the airspace formed in construction space 17 for the drops 15. The portioning occurs via a synchronized aperture, which has been equipped with a jet needle 21 as the closing mechanism. As a result of the required dimensions of the portions and the viscous properties, pressures of around 100 MPa (1000 bar) and above and closing apertures smaller than 0.1 mm and shutter speeds of less than 0.001 s are normally required. As the materials are generally plastics, the temperatures in the material reservoir are up to 450° C.

In these conditions, the device must be implemented as a dosing unit with the least number of seals/contacts on the exterior as possible. In accordance with FIGS. 2 and 3 the closing mechanism is equipped with an elastic malleable solid body joint 24 for this purpose. The cross section in FIG. 3 in particular shows that this is a fixed connection, for example in the sense of a material bridge, which, however, is in the position of being controlled via actuator 26 with the corresponding elastic resilience. Jet needle 21 is used as the closure mechanism, which features bearing zones 21*a*. The material is thinned out laterally to the centered jet needle 21 for the formation of solid body joint 24. On the back, the actuator can act on contact surface 21*b* directly or via an intermediate element. The shutter mechanism uses jet needle 21 to close discharge aperture 27.

At least one processing unit is provided to process the solidifiable material into the liquid phase and from there the prepared material goes to at least one material reservoir 12 with at least one discharge unit 13. From there the material is discharged in the direction of construction space 17 in the form of intermittent drops 15 via a discharge orifice 20 equipped with a synchronizable closure. To ensure the required boundary conditions, at least one pressure generating unit has been provided to generate pressure on the liquid phase in the material reservoir 12. The material reservoir 12, as in the embodiment, can be a component of the processing unit 11, which is formed by a plasticizing unit. The pressure generating unit is then, for example, the feed screw 28 shown in FIG. 1 or a similar means of conveyance.

The jet needle has been attached to the resilient solid body joint 24, which seals material reservoir 12 for the liquid phase of the material to the exterior to (operating) actuator 26. Thus, apart from the filling opening of the material reservoir 12 and discharge aperture 27, no further seals are necessary. As solid body joint 24, formed in a suitable geometric configuration, features quasi integrated restoring forces with respect to the actuator 26 acting on contact surface 21*b* on the exterior, the connection of the actuator to the material reservoir under high pressure and at high temperatures can occur with a minimum contact area and unilaterally relative to the force action.

Figure 2:
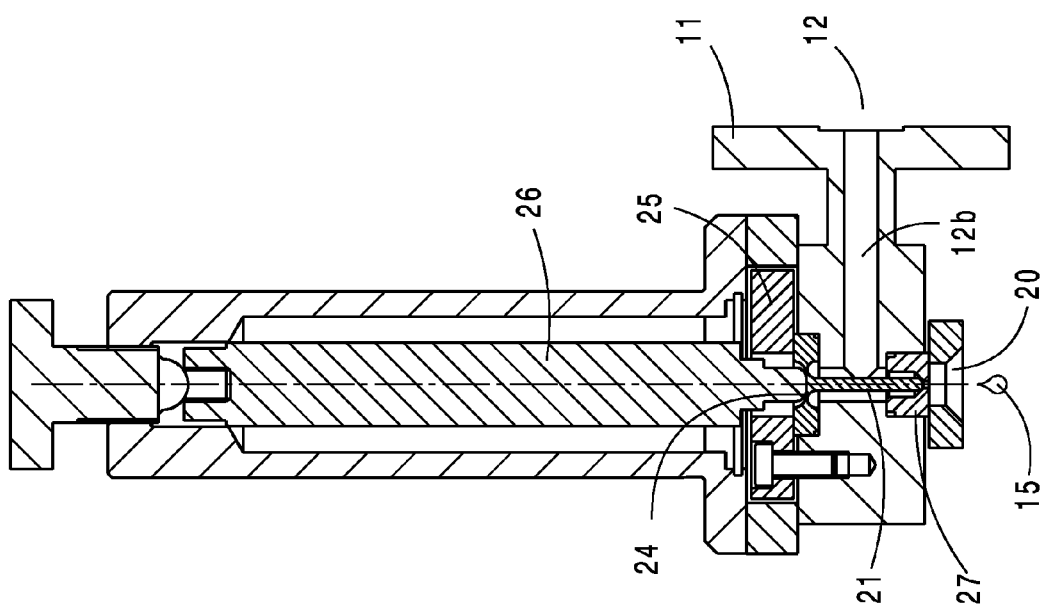
FIG. 2 An enlarged section of FIG. 1 in the area of the discharge unit
Figure 3:
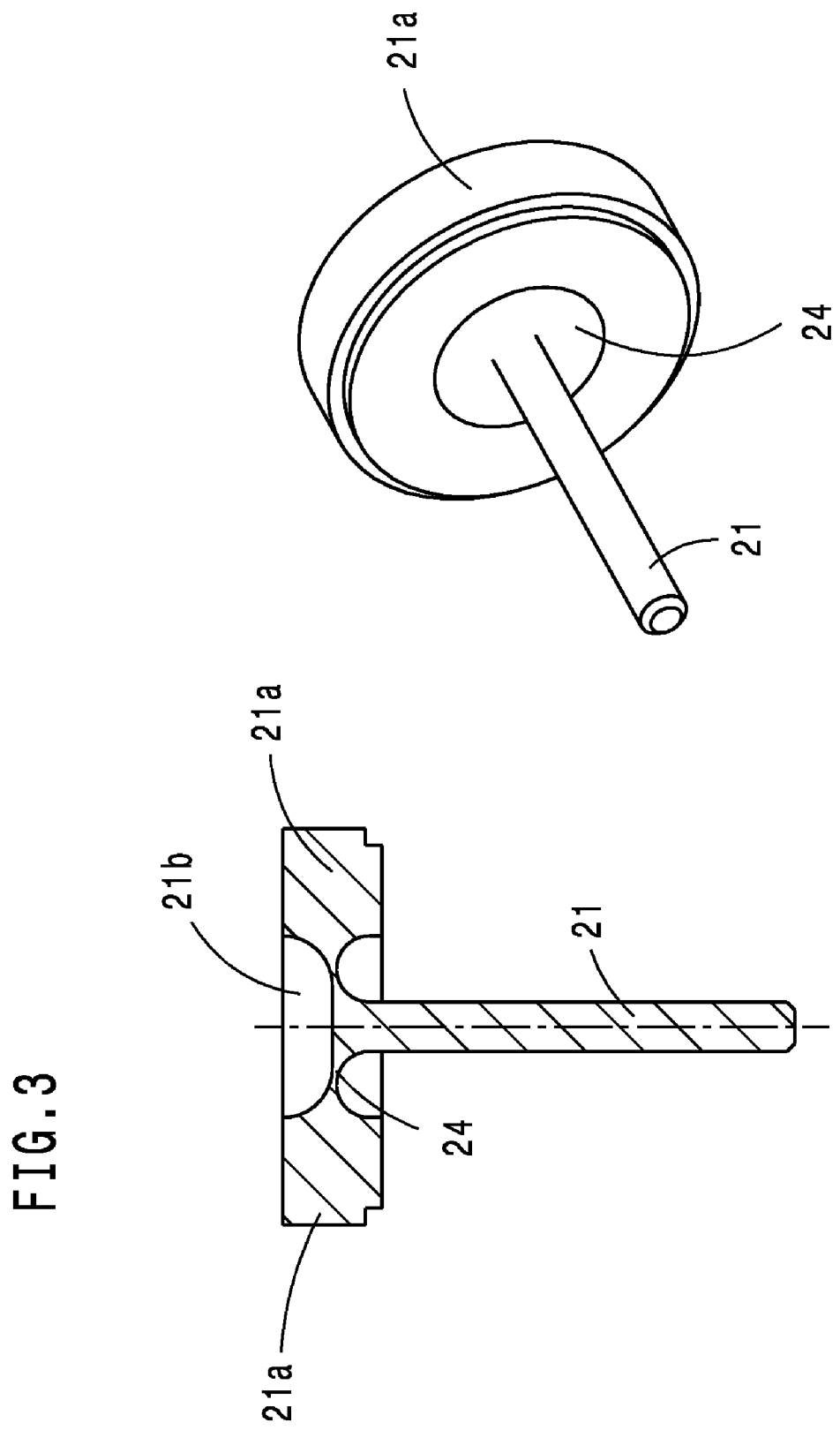
FIG. 3 A cross section and a three-dimensional representational view of the closing mechanism FIG. 4 The discharge unit according to FIG. 2 in conjunction with the associated control
Figure 4:
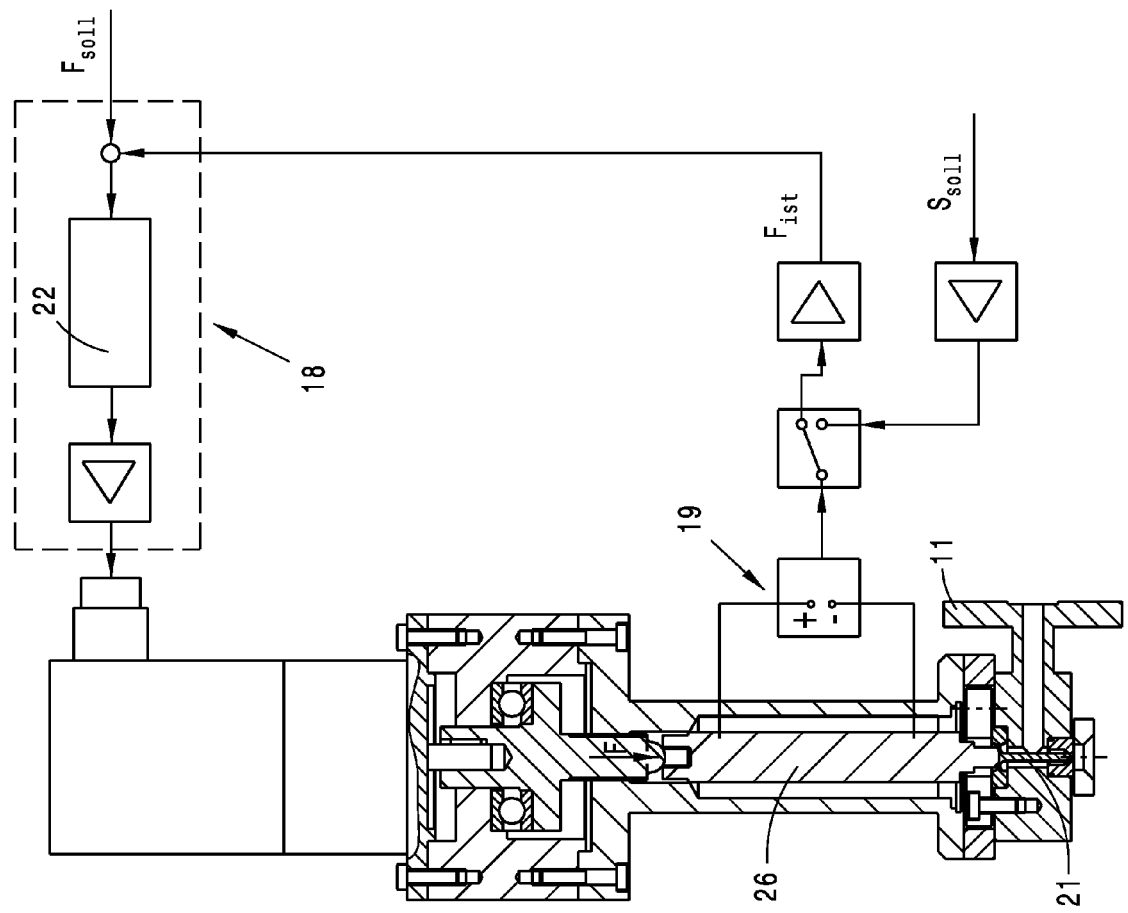

Solid body joint 24 serves both as the seal for the material reservoir 12 in the direction of actuator 26, via which jet needle 21 is operated unilaterally in accordance with FIG. 2. The actuator has ideally been placed in isolation and set apart from material reservoir 12 via an insulating 25 element as indicated in FIG. 4.

The solid body joint 24 that is formed as a result can be made in a variety of geometric configurations and can for example be designed with pre-tension such that the discharge aperture 27 is passively closed or passively open. It can also be produced from a number of pressure and temperature resistant materials, including metals and also fiber-reinforced lightweight construction materials. The surface subject to the pressure in material reservoir 12 or in discharge channel 12b is larger on the side opposite to discharge orifice 20 than in the area of discharge orifice 20. As a result, jet needle 21 would open passively. The result is that actuator 26 actively shuts the discharge orifice or that the discharge orifice opens when no power is applied to the actuator.

Actuator 26 can be developed as an eccentric rotor, a direct magnet or as a piezo element. During pre-tension, actuator 26 can be adjusted manually or by controls as required. Likewise, in accordance with FIG. 4, a sensor 19 can be provided, the signals of which readjust the settings of actuator 26 depending on the operating conditions in the material reservoir and thus the operating point, which is required for compensation, owing to the high pressure and high temperature thermal expansion. According to FIG. 4, for example, the power is recorded at the control element and readjusted to the set values for power via control 18 and regulator 22. As a result, it is possible to readjust the pre-tension of the solid body joint with an automatic actuator adjustment depending on the operating conditions in the material reservoir through suitable pressure and temperature sensors in the material reservoir 12.

For this purpose, actuator 26 is ideally designed as a power gauge to measure the pre-tension of solid body joint 24 at the point of operation and to make adjustments. It is an advantage if the actuator is a piezo element. With a sensor 19 and control 18, it is also possible to drive path/resistance curves along the solid body joint by means of the actuator to influence the shape of the discharged material, i.e. drop shape, in a specifically designed way.

This description can of course be subject to various modifications, changes and adaptations that are found in the domain of similar counterparts to the attached claims.

The invention claimed is:

1. Device for the production of a three-dimensional object made of solidifiable material, which is either present in a fluid phase in its initial state or can be fluidified, by a sequential discharge of drops comprising
at least one construction space for constructing the object,
at least one processing unit for processing of the solidifiable material into the fluid phase,
at least one material reservoir for the fluid phase with at least one discharge unit for the sequential discharge of the solidifiable material in the form of discrete drops in a direction of towards the construction space through a discharge orifice furnished with a synchronizable closing mechanism,
at least one pressure generating unit for generating a pressure in material in the fluid phase in the material reservoir,
wherein the closing mechanism has an elastic deformable solid body joint.

2. Device according to claim 1, wherein the solid body joint is simultaneously constructed as a seal for the material reservoir.

3. Device according to claim 1, wherein the discharge orifice is closable via a jet needle of the closing mechanism, wherein the jet needle is connected to a bearing zone for the jet needle via the solid body joint.

4. Device according to claim 3, wherein the jet needle is adapted to be operated unilaterally via an actuator.

5. Device according to claim 4, wherein the actuator is arranged in isolation from and spaced away from the material reservoir.

6. Device according to claim 4, wherein the actuator is adjustable manually or by controls during pre-tension.

7. Device according to claim 4, wherein a sensor is provided having a plurality of signals which readjust a plurality of settings of the actuator according to operating conditions in the material reservoir.

8. Device according to claim 4, wherein the actuator is designed as a force measuring element for measuring a pretension of the solid body joint at its point of operation and for making adjustments.

9. Device according to claim 4, wherein the actuator is a piezo element.

10. Device according to claim 1, wherein a regulating and control unit is provided for detecting signals of at least one of a sensor and a force measuring element, and using the control values of the detected signals for an actuator for operation of the closing mechanism can be determined or specified.

11. Device according to claim 1, wherein a surface subjected to the pressure is larger on a side opposite to the discharge orifice than in an area of the discharge orifice.

12. Device according to claim 1, wherein the processing unit simultaneously forms the material reservoir.

13. Device according to claim 1, wherein the processing unit is a plasticizing unit, which in the fluid phase exhibits a so called source flow, and wherein the plasticizing unit is coupled to the material reservoir, which can be pressurized for introduction of the fluid phase into the material reservoir.

* * * * *